(12) United States Patent
Nicholas

(10) Patent No.: US 6,379,541 B1
(45) Date of Patent: Apr. 30, 2002

(54) STORMWATER SEDIMENT AND LITTER TRAP

(76) Inventor: Douglas Ian Nicholas, 11 Angus Avenue, Lane Cove, NSW 2066 (AU)

(*) Notice: Subject to any disclaimer, the term of this patent is extended or adjusted under 35 U.S.C. 154(b) by 0 days.

(21) Appl. No.: 09/125,772

(22) PCT Filed: Feb. 21, 1997

(86) PCT No.: PCT/AU97/00100

§ 371 Date: Apr. 19, 1999

§ 102(e) Date: Apr. 19, 1999

(87) PCT Pub. No.: WO97/31162

PCT Pub. Date: Aug. 28, 1997

(30) Foreign Application Priority Data

Feb. 21, 1996 (AU) .............................................. PN8178

(51) Int. Cl.[7] .............................................. B01D 35/02
(52) U.S. Cl. ....................... 210/155; 210/156; 210/162; 210/170; 210/248
(58) Field of Search .................... 210/170, 154, 210/155, 162, 163, 299–301, 248, 232, 747, 156; 404/2, 4; 405/36, 39

(56) References Cited

U.S. PATENT DOCUMENTS

| | | | | |
|---|---|---|---|---|
| 1,349,734 A | * | 8/1920 | Riley | 210/155 |
| 2,106,851 A | * | 2/1938 | Nordell | 210/173 |
| 2,929,504 A | * | 3/1960 | Lind et al. | 210/158 |
| 3,282,430 A | * | 11/1966 | Kinne | 210/170 |
| 4,689,145 A | * | 8/1987 | Mathews et al. | 210/170 |
| 4,859,322 A | * | 8/1989 | Huber | 210/162 |
| 4,956,101 A | * | 9/1990 | Holmberg | 210/780 |
| 5,034,122 A | * | 7/1991 | Wiesemann | 210/162 |
| 5,562,819 A | * | 10/1996 | Turner, Jr. et al. | 210/170 |
| 5,810,510 A | * | 9/1998 | Urriola | 210/170 |

FOREIGN PATENT DOCUMENTS

| | | | |
|---|---|---|---|
| AU | 20319/95 | | 7/1995 |
| AU | 64365/96 | | 6/1997 |
| AU | 64386/96 | | 6/1997 |
| SE | 458862 | | 3/1988 |
| WO | WO94/17896 | * | 8/1994 |
| WO | WO94/20697 | | 9/1994 |

* cited by examiner

*Primary Examiner*—David A. Simmons
*Assistant Examiner*—Frank M. Lawrence
(74) *Attorney, Agent, or Firm*—Skinner & Associates

(57) ABSTRACT

A pollution control device (10) for removal of litter and sediments from a flowing stream of stormwater or the like, the device including an upwardly inclined flume (11,18) adapted to be disposed adjacent the discharge end of a stormwater outlet (16) with a collection container (12) at the opposite end of the flume, the flume (18) and the container (12) being fabricated from expanded metal mesh screen. During stormwater flow, litter entrained with the stormwater is urged up the inclined path of the flume (18) for collection in the container (12) whereas sediments are screened from the flume (18) and the container (12) through apertures in the expanded metal screen and pass through to a sediment sump (29) disposed beneath the device (10). Stormwater which has been so screened is then permitted to flow further downstream. A method of separating litter and sediments from a flowing stream of stormwater is also claimed.

1 Claim, 5 Drawing Sheets

STORMWATER SEDIMENT AND LITTER TRAP

TECHNICAL FIELD

This invention relates generally to improvements in devices for the removal of a range of pollutant materials from flowing stormwater and the retention of these materials for later collection and disposal.

BACKGROUND ART

The escape of a wide range of pollutant materials into water bodies has become an important concern of environmental managers in recent years and various systems have been introduced to drainage systems for the purpose of mechanically removing litter and detritus from flowing stormwater and encouraging heavier materials to settle out so that they can be routinely removed for safer disposal.

Some systems incorporating screens have failed because their screens have become rapidly clogged by litter and detritus or because screen meshes have been made so course in an attempt to avoid clogging that they have been unable to retain many smaller items which are significant pollutants of waterways. Some systems have been unable to retain materials trapped during one storm during a later more intense storm, allowing them to be re-suspended in the more vigorous flow and thus pass downstream. This is particularly the case with captured sediments which may be completely lost if not collected frequently. Many systems are designed so as to retain putrescible materials either completely or partly immersed in water, promoting bio-degradation, causing oxygen depletion, allowing decay residues to escape downstream in solution and making handling and transport of recovered materials more difficult. Some systems retain materials in an intimate mixture of all substances captured, making their handling, transport, and sensitive disposal more difficult. Some systems depend upon or unintentionally create isolated pools of permanent water which may stagnate and provide breeding opportunities for mosquitoes.

DISCLOSURE OF THE INVENTION

It is an object of the present invention to provide an improved means of trapping and retaining stormwater litter and sediments which goes at least some way towards overcoming or at least minimising the prior art problems or limitation outlined above.

It is another object of the present invention to provide an improved means of trapping and retaining floating and neutrally buoyant pollutant particles as small as a few millimetres in diameter and to provide an improved means of settling and retaining heavier, fine-grained pollutant particles while generally dealing with each of the difficulties of existing trash-rack and sediment-trap systems which have been identified above.

It is a further object of the present invention to provide a stormwater litter and sediment trap which is relatively simple in both construction and operation, relatively inexpensive to manufacture and which is easy to clean and to maintain.

These and other objects of the present invention will become more apparent from the following descriptions and drawings.

According to one aspect of the invention there is provided a stormwater litter and sediment trap comprising a flume disposed so as to direct the discharge from the lower part of a pipe culvert through a gradual confining shape transition and a gradual rise in elevation to pass through an opening at the opposite end of the flume into a closely aligned or juxtaposed collection container. The trap is ideally fabricated from expanded metal mesh and especially from apertured and louvred or slatted mesh screen selected for its capacity to inhibit clogging and orientated to the flow of stormwater in a manner which maximises this characteristic and which promotes self cleansing during turbulent flows.

Preferably, beneath the flume and collection container, and extending for a distance beyond their clear edges, is a second assembly comprising a chamber, roofed with one or more layers of screen mesh of a class and orientation selected to dissipate the energy of water failing onto it so as to promote the settling of heavy particles during relatively quiescent flows and their escape trough the screen apertures into the chamber.

Discharge of water from the aforesaid chamber, preferably occurs either through a final screen wrapped in a fine-meshed filter cloth capable of retaining small particles or through a similarly filtered subsoil drainage system built into the chamber floor to allow the chamber to drain fully after pipe flow ceases. Water can also pass from the chamber through its mesh roof but does not do so in large quantities because there is a small hydraulic gradient only during high flows because the mesh induces a plane of separation because water flowing naturally downstream over the mesh surface has to sharply change direction to pass into the chamber. This means that flow through the chamber tends never to reach a velocity at which settled material is re-suspended so that little sediment is lost from the trap.

According to another aspect of the present invention there is provided a stormwater litter and sediment trap of the above described type wherein the device is installed elsewhere within the drainage system other than at an outlet e.g. further upstream.

According to a further aspect of the present invention, there is provided a method of separating litter and sediments from a flowing stream of stormwater, comprising diverting the stream of stormwater along an upwardly inclined path to a point where litter is separated and collected from the stream and diverting the sediments to a collection point below the upwardly inclined path and litter collection point.

One particular application of the present invention relates to the stormwater discharging from a pipe culvert into a watercourse, estuary or other water body and it will be convenient to describe the invention with reference to that particular application. It is to be understood that this is not to be taken to limit the scope of the invention which has application to all other forms of open and closed conduit and may be used anywhere along the line of such conduits in a covered or open situation and in single or multiple configuration.

BRIEF DESCRIPTION OF THE ACCOMPANYING DRAWINGS

The invention will now be described by way of example only and with reference to the accompanying drawings, wherein:

FIG. 4A illustrates the collection container (basket) floor;

FIG. 4B illustrates the collection container (basket) roof,

FIG. 4C illustrates the container (basket) walls, with the left side being the "inside" or upstream side, and with the right side being the "outside" or downstream side, FIG. 4D illustrates the sediment sump cover at the upstream end, FIG. 4E illustrates the sediment sump cover at the downstream end; and FIG. 4F illustrates the rising floor of the flume.

BEST MODE OF CARRYING OUT THE INVENTION

Figure 1:
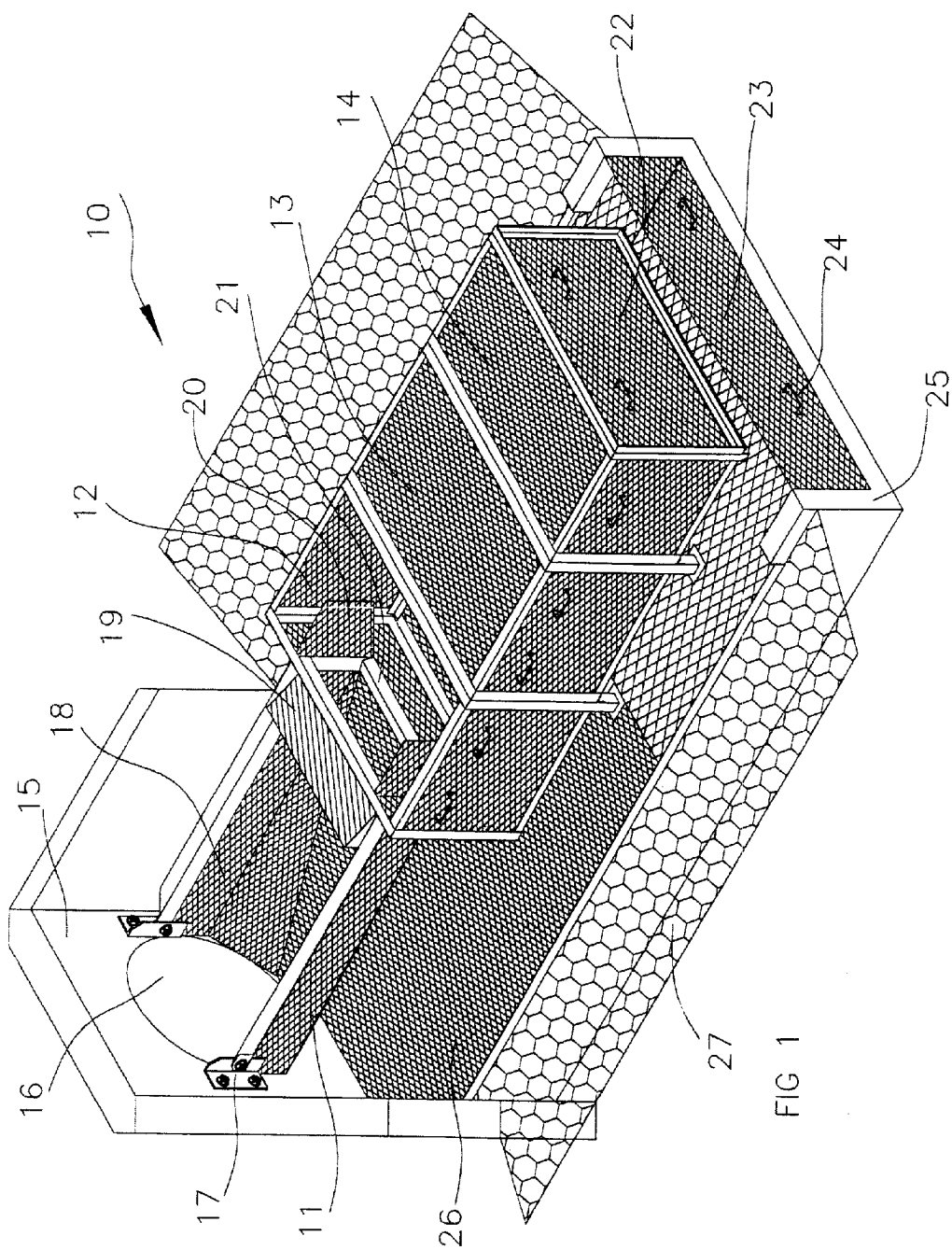
FIG. 1 is a perspective view of stormwater litter and sediment trap according to one embodiment of the present invention, with the top cover of the flume and the top screen panel of the primary collection container removed for clarity.
Figure 2:
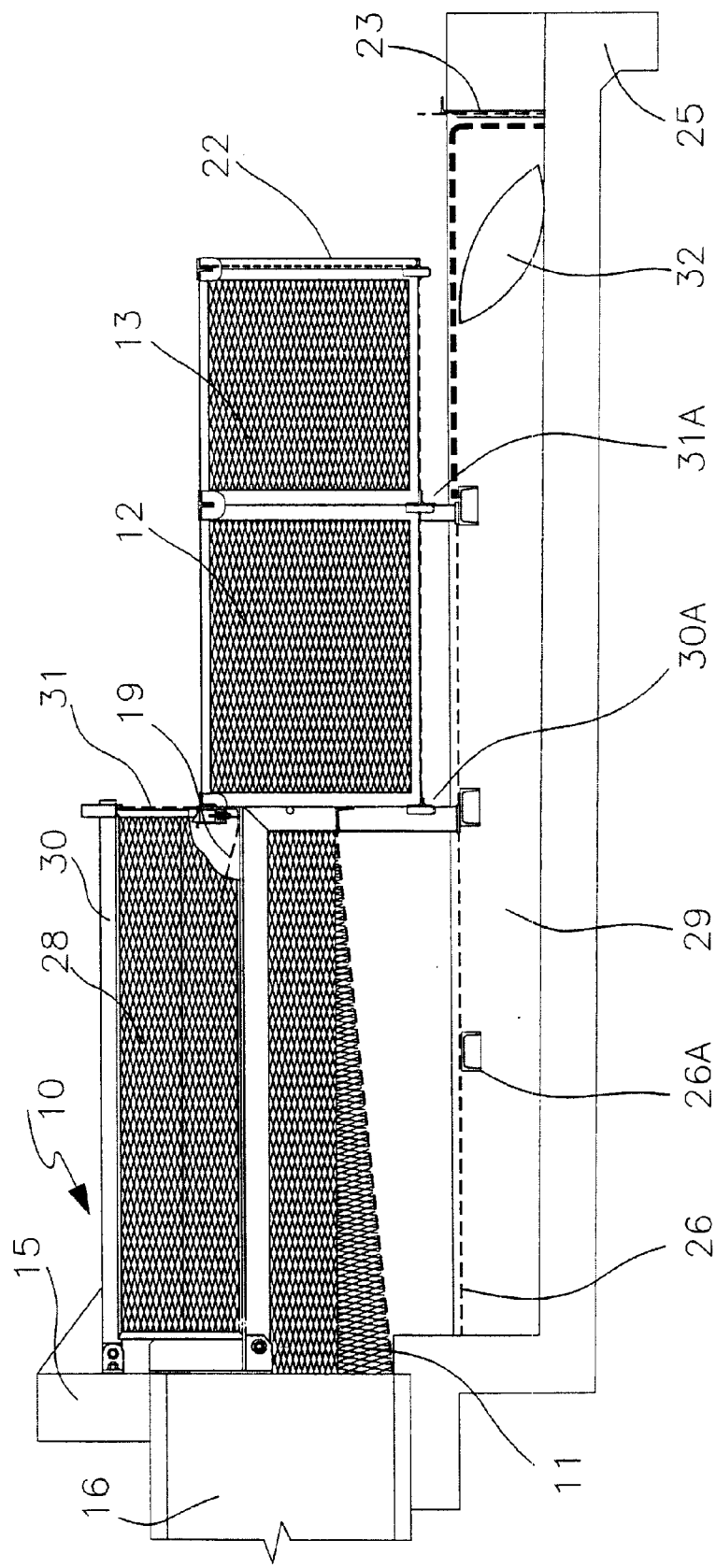
FIG. 2 is a side view of the stormwater litter and sediment trap of FIG. 1, sectioned along the centre line.

Referring to FIGS. 1, 2, 3A and 3B, and in the first instance especially to FIGS. 1 and 2, there is shown a stormwater litter and sediment trap 10 comprising a flume 11 connected at one end to the pipe head wall 15 of a culvert, disposed about the opening or outlet of a stormwater pipe 16 discharging into a channel or watercourse. The flume is connected to the concrete head wall 15 by means of mounting brackets 17. The flume is operatively connected at its opposite end to a primary collection container or basket 12 which is conjoined in this embodiment with an extension basket 13 and an end basket 14. A series of these baskets is used according to the litter load of the particular catchment.

The flume, collection baskets and there surrounds, are fabricated from expanded metal mesh, and preferably from apertured/louvred mesh, such as 'Maximesh' supplied by BHP Steel, which is described in more detail herein below.

The flume 11, 18 provides a gradual confining configurational transition from its entry point to its discharge end including a gradual elevation from one end to the other, providing a gently rising ramp up which litter must be driven by water flow to reach the collection basket(s) at the opposite end the flume.

Stormwater reaching the system during minor rainfall events or casual flows usually has a low velocity and so falls directly through the mesh of the flume 11 which filters all litter and suspended particles larger than a few millimetres in diameter from the flow. Litter does not reach the collection basket in minor flows but will accumulate in the reservoir provided by the flume and the upstream pipe 16 slowly blanketing the screen and progressively reducing through-flow as the mat thickens. The mesh class and orientation required by the invention causes litter to settle across the stippled surface, resisting the penetration which cause material to key into the screen apertures so that it tends to be dislodged by relatively turbulent, higher energy flows which my follow.

After falling through the flume 11, 18 mesh in minor events water then passes through the mesh roof 26 of the sediment trap 29 below, releasing heavier sediments as its energy is dissipated by the drop into relatively still water and by the hydraulic characteristics of its broad, shallow, low gradient flow-path through the chamber and outlet filter.

As storm flows increase, the water discharging from the pipe 16 has an increasingly higher momentum which becomes sufficient to project the flow through the rising flume 18 to the collection basket threshold, carrying with it the litter, detritus and grit which has accumulated in the pipe and flume during minor flows. Turbulent flow over the mesh of the flume during this phase re-suspends material which has blanketed the screen, carrying it into the basket and restoring the full capacity of the flume walls and base to release water. This reduces flow passing to the collection basket for screening.

Stormwater with entrained litter is channeled or ushered by means of the rising flume 18, the flume hood 19 and the flume cover 28 to the collection basket threshold where it is discharged from the flume outlet and inlet sill 21 of the primary collection basket 12. In some embodiments, this opening may include one or more bars to prevent access by children or other unauthorised personnel. Inlet wings 20 on either side of the opening assist in preventing litter in the swirling stormwater from re-entering the flume.

Material reaching basket 12 includes a proportion of fine particles some of which settle within the basket or are captured by the litter collected temporarily on basket walls. Those particles falling to the floor are disturbed by turbulence and fall through the basket mesh to the meshed roof 26 of the sediment chamber or sump 29 below.

Materials accumulating on the chamber roof (sediment sump cover) 26 are tumbled by storm-flows across the stippled mesh, which is orientated to best receive it, to fall progressively through the mesh into the chamber 29 below.

After each storm event, collected material in the basket 12 will slough to the floor where it acts in a way comparable to that of litter accumulating in the flume 11 to be re-entrained during the early phase of the next high discharge event and carried to the extreme downstream end of the collection basket group. A typical installation may use several basket units in series dependent upon the litter load imposed by the catchment. Baskets are connected one to another by any suitable means, such as by means of connecting dowels and dowel keeper angle brackets, as at 30A and 31A in FIG. 2.

In major storms the capacity of the flume 11 and collection baskets 12, 13, 14 to pass water is exceeded and water bypasses by weir flow either across the top of the baskets or over the sides of the flume, to flow past the outer surfaces of the collection basket. The basket mesh is orientated to favour passage of some of this water back into the basket so that it tends to loosen litter collecting against the inner screen surfaces and assist its progression to the downstream end of the basket train.

After the stormwater has subsided, and either after each such event or a series of events over a period of time, the baskets can be cleared of accumulated litter by opening the end gate 22 and raking out the litter for removal.

The heavier sediments grit and detritus which passes out through the apertured walls and floor of the flume and/or the collection baskets is collected in the sediment chamber, which comprises, a sediment sump and trap foundation 25, usually either a concrete apron or a channel cut into the rock surface of the waterway; a mesh cover 26 supported by transverse beams 26A, with the space in between the cover 26 and the foundation 25 comprising the sediment sump 29. Sediment deposits tend to accumulate at the distal end of the sediment chamber, and a sediment sluice gate 23 with handles 24 is provided at the distal end for regular cleaning access.

A rock blanket formed on either side of the waterway and sump chamber 29 prevents scouring of the waterway and assists in retaining a pond over the sediment sump cover 26 during minor flows.

An oil absorbent pillow 32 extends across the sump chamber 29, suspended from the meshed roof 26 to assist in the retention of oil residues entering the sump.

Figure 3A:
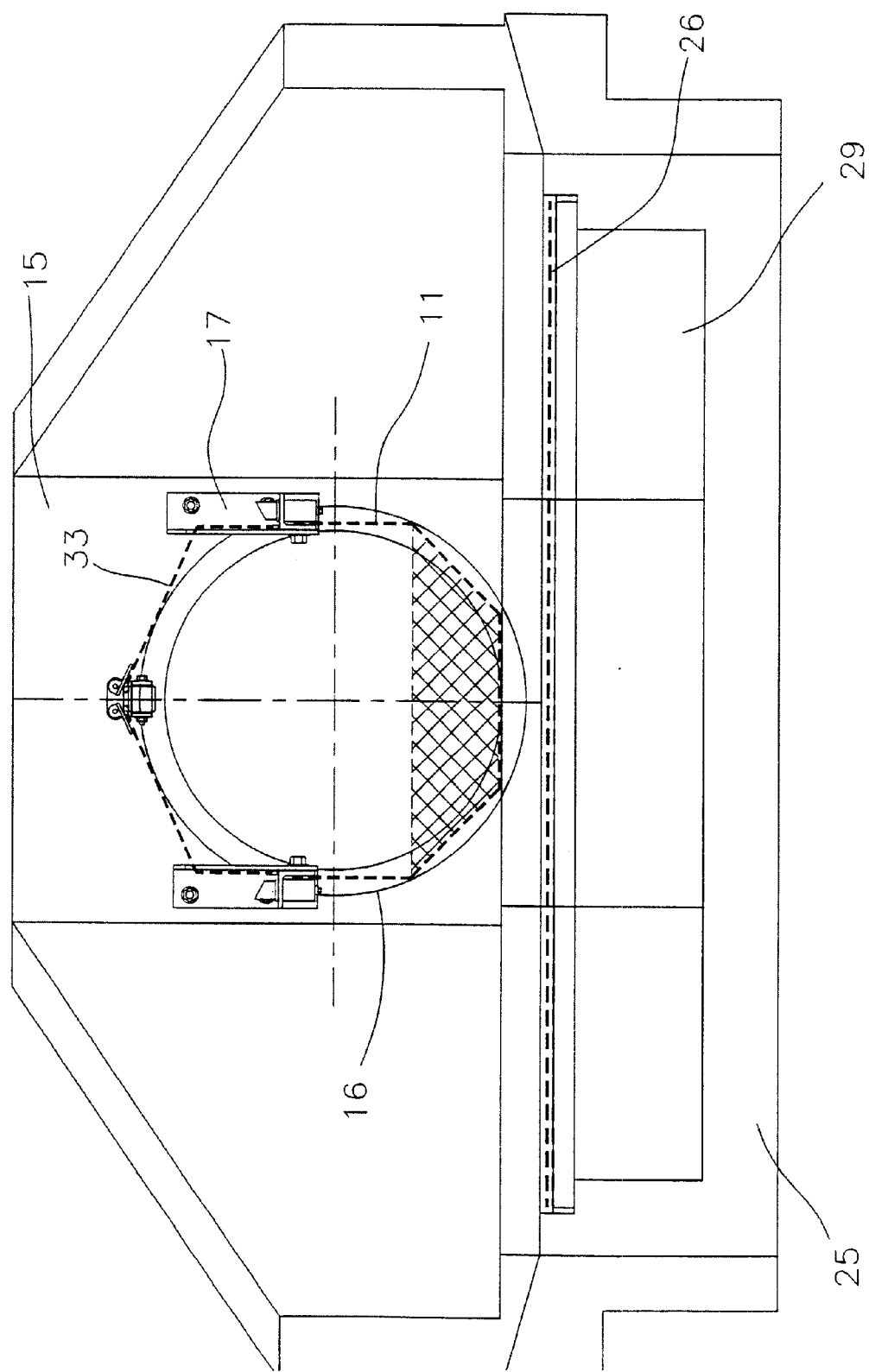
FIG. 3A illustrates an end elevation view of the flume looking upstream.
Figure 3B:
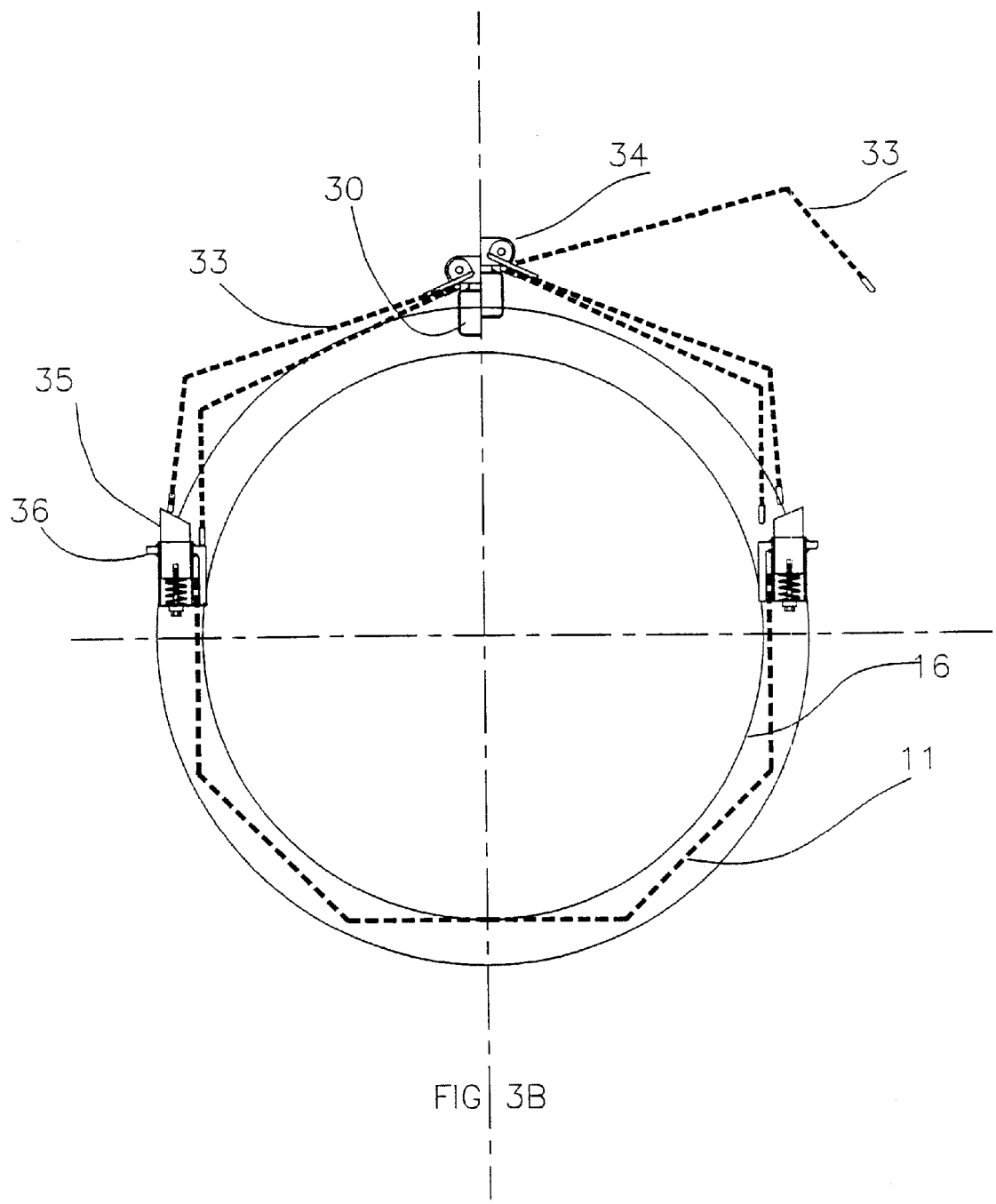
FIG. 3B is an elongated and elevation view of the flume looking upstream, and showing the operation of the flume hood.

Referring to FIGS. 2, 3A and 3B, the flume 11 is provided with a flume cover 28, attached to a beam 30, which is hingedly attached at one end to the pipe head wall and is supported at its opposite end by a post and yoke 31. During a major stormwater flow event, if the volume of stormwater exceeds a predetermined level, the individual wing halves 33 of the flume cover (FIGS. 3A and 3B), which are hinged (as at 34) longitudinally along the support beam 30, are adapted to be raised by the stormwater flow (FIG. 3B) to release stormwater and to relieve any build up of back-pressure within the system. Self-closing and/or opening catches are provided at the distal end of wings 33 which co-act with keepers 35 provided on the upper edges of gunwales 36 of the flume 11 to ensure positive closure of the wings 33 after the excess flow of stormwater has subsided. Alternatively, the catches are provided on the gunwales.

As indicated herein above, the expanded metal mesh from which the stormwater litter and sediment trap is fabricated is preferably an apertured louvred mesh such as 'Maximesh' from BHP Steel. The ideal orientation of the louvred mesh for various surfaces is illustrated in FIGS. 4A to 4F, inclusive. The utilisation of particular mesh characteristics and orientation in the roof, floor and walls of the flume and the collection baskets is preferred to reduce dynamic conditions which can cause litter to be thrust directly into screen apertures, and in order to maximise flow across screen faces in the self-cleaning mode and to encourage wet litter to slough from the walls as the water level falls.

Figure 4C:
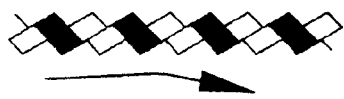
FIGS. 4A–4F depict various configurations or orientations of the mesh screen of which the inventive trap is comprised. Specifically.
Figure 4F:
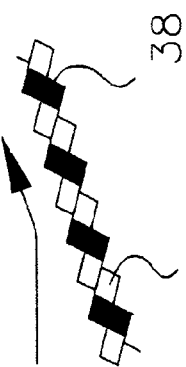
Figure 4B:
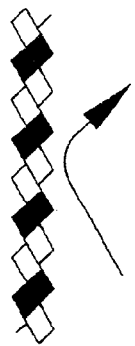
Figure 4E:
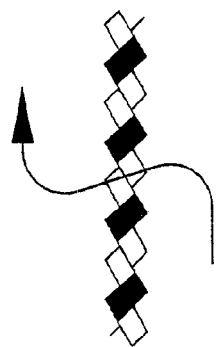
Figure 4A:
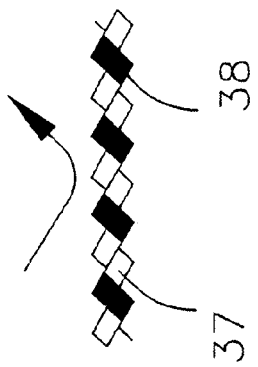
Figure 4D:
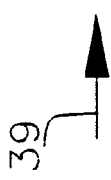

FIGS. 4A–4F show a cross-sectional representation of the expanded metal mesh used throughout the assembly to illustrate the orientations of the mesh to water flow direction which are variously used to maximise choke resistance, flow inhibition or self-cleaning capacity. FIG. 4A illustrates the orientation used for the collection container floor. FIG. 4B illustrates the orientation used for the roof of the collection containers and the sediment chamber. FIG. 4C illustrates the orientation used for all vertical walls of the basket, with the left side being the "inside" or upstream side, with the right side being the "outside" or downstream side. FIG. 4D illustrates the orientation used for the sump cover at the upstream end with flow from the inside to the outside represented by arrows. FIG. 4E illustrates the orientation used for the sediment sump cover at the downstream end; FIG. 4F illustrates the orientation used for the rising floor of the flume. In each case the mesh is shown schematically with the dark and light components showing the apertured 37 and louvred 38 nature of the mesh on the longitudinal centre-line of each run of apertures. This arrangement alternates with parallel runs of apertures, moving across the mesh. The arrow 39 indicates the downstream direction for each of FIGS. 4A to 4F.

Although the pollution control device of the present invention has been configured and described in relation to the preferred embodiment herein as a system to facilitate maintenance by hand, to favour its use where machine access is difficult or not possible, other embodiments of the invention adapted for mechanically assisted servicing but incorporating all of the inventive features of the embodiments described herein, are encompassed by the invention.

Although an exemplary embodiment of the present invention has been shown and described, it will be apparent to those having ordinary skill in the art that a number of changes, modification or alteration to the invention described herein may be made, none of which depart from the spirit of the present invention. All such changes, modifications and alterations should therefore be seen as being within the scope of the present invention.

It should be appreciated that the present invention provides a substantial advance in the removal of a range of pollutant materials from flowing stormwater, providing all of the herein disclosed advantages without incurring any relative disadvantage.

What is claimed is:

1. A stormwater litter trap comprising an apertured flume disposed at a downstream end of a stormwater outlet so as to direct the discharge from a stormwater pipe or other drainage outlet through a gradual confining shape transition and a gradual rise in elevation towards the discharge end of the flume, and an apertured collection container disposed adjacent the discharge end of the flume, wherein the flume is provided with an apertured top cover which is hinged in relation to said flume and is normally closed but is adapted to open if the volume of stormwater exceeds a predetermined level to release accumulated stormwater, and to close again when the flow of excess stormwater subsides, whereby the flowing stream of stormwater containing litter discharging from the stormwater pipe or outlet during or after a storm event is channeled via said flume whereby the litter is urged under the influence of the flowing stream towards the collection container and the litter is screened from the water via said flume and collected in said collection container at a position which is separate from and free-draining in relation to said flowing stream of stormwater, and screened water is channeled away from said trap.

* * * * *